United States Patent
Fernandez-Garcia

(10) Patent No.: US 9,505,656 B2
(45) Date of Patent: Nov. 29, 2016

(54) PREMIXING AND DRY FIBRATION PROCESS

(76) Inventor: Carlos Javier Fernandez-Garcia, Morelos (MX)

( * ) Notice: Subject to any disclaimer, the term of this patent is extended or adjusted under 35 U.S.C. 154(b) by 1411 days.

(21) Appl. No.: 12/516,792

(22) PCT Filed: Nov. 21, 2006

(86) PCT No.: PCT/MX2006/000130
§ 371 (c)(1),
(2), (4) Date: Jan. 11, 2010

(87) PCT Pub. No.: WO2008/063040
PCT Pub. Date: May 29, 2008

(65) Prior Publication Data
US 2010/0139527 A1    Jun. 10, 2010

(51) Int. Cl.
| C04B 26/06 | (2006.01) |
| C04B 28/02 | (2006.01) |
| C04B 111/00 | (2006.01) |
| C04B 111/80 | (2006.01) |

(52) U.S. Cl.
CPC ............... C04B 26/06 (2013.01); C04B 28/02 (2013.01); *C04B 2111/00293* (2013.01); *C04B 2111/802* (2013.01); *Y02W 30/97* (2015.05)

(58) Field of Classification Search
CPC ....... C04B 26/02; C04B 26/06; C04B 28/02; C04B 2111/00293; C04B 2111/802; Y02W 30/97
USPC ...... 366/1, 2, 6, 7, 8, 23, 24, 26, 325.4, 307
See application file for complete search history.

(56) References Cited

U.S. PATENT DOCUMENTS

| 2,587,531 | A | * | 2/1952 | Saxe ................................. 366/8 |
| 2,727,733 | A | * | 12/1955 | Carswell .......................... 177/70 |
| 2,863,651 | A | * | 12/1958 | McBride ........................... 366/18 |
| 3,650,785 | A | * | 3/1972 | Ball et al. ...................... 106/644 |
| 3,885,774 | A | * | 5/1975 | Harris et al. .................... 366/20 |
| 3,895,781 | A | * | 7/1975 | Lodige et al. ............. 366/165.2 |
| 4,092,737 | A | * | 5/1978 | Sandell ............................. 366/3 |
| 4,527,902 | A | * | 7/1985 | Christen .................... 366/170.4 |
| 4,548,507 | A | * | 10/1985 | Mathis et al. ................... 366/20 |
| 4,706,893 | A | * | 11/1987 | Brock ............................. 241/23 |
| 4,881,819 | A | * | 11/1989 | Blees ................................ 366/8 |
| 4,923,517 | A | * | 5/1990 | Rerup et al. ...................... 524/3 |
| 4,997,284 | A | * | 3/1991 | Tousignant et al. .............. 366/8 |
| 5,028,266 | A | * | 7/1991 | Rettenmaier .................. 106/282 |
| 5,044,819 | A | * | 9/1991 | Kilheffer et al. ............... 404/72 |
| 5,224,774 | A | * | 7/1993 | Valle et al. ....................... 366/2 |
| 5,236,500 | A | * | 8/1993 | Schneider et al. ............ 106/640 |
| 5,242,983 | A | * | 9/1993 | Kennedy et al. .............. 525/309 |
| 5,316,197 | A | * | 5/1994 | Tobler et al. .................. 222/281 |
| 5,407,139 | A | * | 4/1995 | Mleczewski ..................... 241/18 |
| 5,480,256 | A | * | 1/1996 | Itsekson et al. ................ 404/72 |
| 5,590,976 | A | * | 1/1997 | Kilheffer et al. ............... 404/72 |
| 6,042,259 | A | * | 3/2000 | Hines et al. .................... 366/17 |
| 6,099,638 | A | * | 8/2000 | Garcia ........................... 106/724 |
| 6,183,123 | B1 | * | 2/2001 | Sniegowski et al. ............. 366/8 |
| 6,554,465 | B2 | * | 4/2003 | Cruso ............................... 366/3 |
| 6,971,784 | B1 | * | 12/2005 | Bracegirdle ....................... 366/7 |
| 7,563,017 | B1 | * | 7/2009 | Bracegirdle ....................... 366/7 |
| 2002/0101779 | A1 | * | 8/2002 | Cruso ............................. 366/30 |
| 2005/0219938 | A1 | * | 10/2005 | Rigaudon et al. ................. 366/3 |
| 2006/0087910 | A1 | * | 4/2006 | Knepp .............................. 366/1 |
| 2007/0104020 | A1 | * | 5/2007 | Knepp .............................. 366/6 |
| 2008/0101150 | A1 | * | 5/2008 | George et al. .................... 366/8 |
| 2008/0101151 | A1 | * | 5/2008 | Frank et al. ...................... 366/8 |

FOREIGN PATENT DOCUMENTS

| JP | 3208847 | 9/1991 |
| JP | 9136314 | 5/1997 |

OTHER PUBLICATIONS

A method of evaluating grading on concrete aggregates by S. Popovics, (1961), pp. 17-19, 21-22, 41. (total 7 pages).*
The effects of aggregates characteristics on the performance of Portland cement concrete (2004) by ICAR (International center for aggregates research), pp. 1, 13-15, 17-20, 27-20. (total 13 pages).*
Mukalazi, Ronald, and Chun Qing Li. Investigation of the Properties of Concrete Modified with Various Fibres. vol. XII DMBC, Porto. International Conference on Durabilty of Building Materials and Components, 2011. 1-8. Print. XII DMBC, Porto, Portugal, Apr. 12-15, 2011.*

* cited by examiner

*Primary Examiner* — Tony G Soohoo
(74) *Attorney, Agent, or Firm* — Roberts Mlotkowski Safran Cole & Calderon, P.C.

(57) ABSTRACT

The process is described for the dry mixing of fibers of different types and sizes with materials formulated with cementants or agglutinant components, granular aggregates and able to include or otherwise other additional ingredients. The principal characteristics of the process are to ensure a correct incorporation of the fibers with the rest of the materials, increase the mechanical fastening of same with the rest of the components and facilitate the use of formulas with high fiber content (over-fibration).

10 Claims, No Drawings ed and applied, regardless of the method used. Prior to this process, the homogeneity of the wet mix with fibers was sought, the result of which was not satisfactory, since this process does not allow the proper dispersion of the fibers. The intimate contact mentioned is what allows the mechanical capacity of the fibers to be used to the full and therefore the increase of the concentration of fibers per unit of volume of mix.

PREMIXING AND DRY FIBRATION PROCESS

FIELD OF INVENTION

This process innovates the production of premixing products for application in the arts, construction, engineering and industry in general for diverse products that contain cementants and/or adhesives or agglutinants, as well as loads or fine and/or heavy aggregates in a dry and inactive state, typically in powder or granular products prior to activation in order for their hardening process to start. In particular, these materials will be fibrated, micro-fibrated and/or multi-fibrated using this process, as well as micro-structured and/or pre-structured, whichever is applicable.

This invention also increases the content of fiber in material, referred to hereinafter as "over-fibration", since due to its technical status, amounts of fiber considerably lower than those proposed are used. The purpose of "over-fibration", independently of inhibiting the formation of fissures and micro-fissures during initial and subsequent setting, is to provide greater mechanical resistance in an isotropic arrangement and thus modify the rheology of the material by interconnecting the filaments.

OBJECT OF THE INVENTION

This new process guarantees an appropriate and correct dosing and homogeneity in dry fibration of materials prior to the application process. This process is used to fibrate cement-based concrete and mortar (Portland or Puzolana) and compound material based on other cements that include loads or granular aggregates. It is therefore very important for the micro-structure the compound materials and the so-called super materials and micro-concrete.

Materials obtained in this manner have increased mechanical resistance, which is manifested isotropically, reduced permeability due to the reduction of pores, the reduction or elimination of the formation of cracks that form due to shrinking during setting, the elasticity module is modified favorably and the rupture pattern become more favorable because the rupture ceases to be fragile and therefore maintains residual resistance that acts to reduce the collapse of structures that have been exposed to excessive stresses or earthquakes.

Although the practice of incorporate fibers in fresh concrete already exists, the object of this patent is also to allow the use of greater proportions of fiber with regard to the cementants and aggregates, in amounts substantially greater (up to 10 times greater and in even greater proportions) that were not possible prior to this invention. This invention also allows the anchoring of fibers by favorably modifying their surface properties.

BACKGROUND

The occasional use of fibers to reinforce the stopping of the formation of cracks in the technical status is already known, in my U.S. Pat. No. 6,099,638 describes the use of fibers in rheological applications, concrete, micro-concrete and mortar. Although the technical status mentions the use of fibers (for example Garcia Rivero, J. L., "*Technical Construction Manual*", published by Cementos Apasco), the mixture of fibers with the components of concrete is prepared in a fresh, i.e., in a damp state. The need to formulate the application in a dry state described in my aforementioned U.S. Pat. No. 6,099,638 led to the development of this invention.

In the particular case of the preparation of concrete and mortars, cement, sand, gravel, additives were used and water was added to start the setting process, and in some cases, reinforcement fibers were added to prior to laying or application. Due to the fluidity of these mixtures during setting, certain means to contain and give them form must be used, for example, the ground, frames, molds or forming.

When the designer decides to use fibers to reinforce the stopping of cracks, which fibers are incorporate in the mix having added water or a precursor agent and dry fibration processes are not used. The incorporation of fibers in the wet mix leads to problems of a lack of uniformity, compactness and stratification of the fibers and the jamming of the mixing equipment. By the other hand, the manner in which the fibers prevent to achieve the mechanical fastening with the rest of the mix. Up to now, these problems have limited the concentration of fibers in the mix and their full use, regardless that by increasing the percentage of the fibers recommended affects and even prevents the correct laying of the concrete in its forming or molds.

Problems arise during the mixing of fibers with wet materials that have prevented the correct incorporation of the fibers because compactness is generated, mixing is difficult or the mix stratifies or settles and a sufficiently uniform mix cannot be obtained. This has limited the range of fiber formulations, reducing it to small proportions in relation to the other ingredients, to the order of 0.02% of fiber by weight in relation to the wet mix or typically 600 g of fiber for each cubic meter of wet mix for formulations based on Portland-type cement with gravel and sand, according to the technical recommendations of the providers of this type of fiber. This proportion is equivalent to 0.024% of the weight of the dry mix (without adding water).

Prior to the aforementioned patent, these fibers were many used to reduce fissures that appeared during contracting while drying in mortars and concrete and with the intention of providing a certain amount of reinforcement for this purpose, although with limited success. Before this invention, there was no process that permitted a successful dry formulation and to date, the manufacturers and the fibration standards themselves recommend or stipulate the application in a fresh state (at the time of mixing) and in a low proportion in relation to the rest of the ingredients.

Said dosing, mixing and wet materials management process used by the technical status is appropriate for applications used in the previous arts on the construction site.

Besides the problems mentioned, there are other additional problems that arise in the application of fiber when using rocky materials, such as (i) the mechanical fastening of the fibers with the rest of the material components (cementants and load) is so low that the mechanical resistance of the fibers is not used to the fall, which prevents it reaching its full capacity in the formulation of the material and (ii) the lack of uniformity in the concentration of fibers in the resulting material.

The process forming the subject matter of this invention solves all of these problems by applying controlled dispersal and abrasion forces that distributes the fibers uniformly, positively modify therefore, maximize the surface area of the solid (fiber)-solid (cementants) interfaces and ensure intimate contact with the cementing components of the mix with the fibers in order to use its resistance to the maximum. The dry mix is homogenous in terms of the concentration of fibers and this homogeneity is maintained when the mix is hydrated or activated for setting and subsequent application. This ensures that the final properties are as intended by the formulation of the mix and increase the possibilities of dosing, multi-fibration and over-fibration of mortar, concrete, micro-concrete and other compound materials. This process increases the capacity of uniform dosing of fibers or micro-fibers and their mechanical fastening, which leads to the commencement of a physical pre-structure process and achieves the positive modification of the properties of the product.

The phenomenon on which this invention is based arises primarily in the dry mix, without spoiling the complementary use of the wet mix method.

This knowledge (which is basic for innovation) has demonstrated that the shortcomings of construction materials is generally due to that constructors do not have access to well-manufactured materials or super-materials (so-called due to their resistance and high-performance).

This novel dry-fibration process is applicable both for concrete and mortar based on Portland or Puzolana cement and for compound materials based on other different types of cementants.

DESCRIPTION OF THE INVENTION

The object of this invention is to achieve the correct fibration and over-fibration of compound materials that include fiber in their formulation for the purposes of reducing an isotropic material, the elements of which are perfectly aligned in such a manner that they comply fully with the design specifications, such as resistance to compression stress, tension and flexion, permeability, resistance to rupture, elasticity module, workability in a fresh state, shrinkage, surface finishing, setting, etc.

The type of fiber (material, thickness, shape, length, resistance, etc.) shall be appropriate for the specific application and may be organic, inorganic, mineral, non-mineral, natural, synthetic, smooth or textured (with terminals or nodes) or other predetermined shapes to increase mechanical fastening. The type of fiber may be single or two or more multiple fibers used simultaneously, including thicknesses (of 0.02 µm to 5008 µm or their equivalents of 0.78 to 200 thousands of an inch), lengths (typically 0.2 to 100 mm and if required by the designer, continuous fibers of lengths similar to the length of the mold or the finished piece) and materials such as those mentioned in the following paragraphs in order to provide different characteristics to the resulting materials.

At the same time the cementants, which can be based on Portland or Puzolana cement or polymers (natural or synthetic), glass, clays (natural or synthetic) and the additives and loads should be dosed based on the specific needs of the designer for the desired applications.

For example, in the specific case of materials for rocky products applicable to construction in general, the use of polyolefins, polypropylene and polyethylene fibers is recommended, alone or combined, and whether of a conventional or micro-fiber type, together with monofilaments and multi filaments. The use of fibers in other materials is also included, such as different polymers, (polyester, polyamides, acrylic, polyvinyl, aramid (Kevlar®) and others), inorganic fibers, (glass, coal, metallic, mineral, ceramics, etc.) organic (cellulose, vegetal and animal), etc.

The dry fibration process allows the fibers, on being subjected in a controlled manner to the abrasion forces, undergo a modification to the cylindrical state which results in their extrusion and elongation process passing to an amorphous-cylindrical state which considerably benefits the mechanical anchoring of the fiber and results in a very significant increase in the surface area which the fiber will present to the cementant.

In order to continue with the "optimum process" (solely as an example), it is advisable that dosing take place at intervals with the granular loads (basically sands), and subsequently, as applicable, heavy aggregates, gravels for example, and conclude finally with the cementant, without discarding that the heavy aggregates can be mixed fresh, at the work site.

To do this as an additive (without loads) or with micronized loads, the mixing time should be increased and inspection tests carried out to ensure the correct incorporation and uniform distribution of the fibers.

For this type of materials an abrasive process is recommended. This can be achieved through various mixing methods in the technical state, to mention only a few: the "trouser" type mixers with paddles, the helicoidal worm, the intensive mixer and others which are highly efficient. This patent does not pretend to design the optimum model of machinery for the mixing. The intention is to claim the inventive concept of the process for dry fibration and over-fibration.

The advantages of the novel concept of dry fibration will benefit the isotropy and uniformity, being even able to micro-structure by increasing the resistance of the materials. It will also facilitate application and work at the work-site, thus making it possible to have premixed fibrated materials available.

This process also benefits the end resistances, and when well dosed and executed can even eliminate the pores from the end product. This characteristic has the novel effect that with certain formulas a material with a very high level of impermeability is obtained. On another aspect, novel materials obtained from this process are generated which can be utilized as high resistance micro-structured rocky materials for reinforcement operations or as a structural element in itself, and also for waterproofing due to its low permeability.

Also, when the materials are dosed, fibrated and mixed with suitable formula following the recommendations contained herein and the claims of this patent, the stress-deformation curves of the materials can be favorably modified on an average of 500%, thus benefiting resistances as important as the anti-seismic. With this we achieve a new generation of mortars and concretes and sundry other materials, and promote a better use of cementants.

An additional point is that the invention does not imply the use of materials harmful to health or the environment. For this object the recommendation is not to utilize fibers such as asbestos or those which, due to their size and properties, remain suspended in the air and do not decant.

The process forming the subject matter of this invention consists of the following:

1. Design of the product (for specific application), preferably to obtain a micro structured product. In this product, the proportions of the cementing agent, granular material (aggregates), additives, hardener, water (as applicable), fibers and other components of the mixture and other characteristics known by the designer to obtain the physical, mechanical and molding characteristics required for the application considered will be established.
2. Initial mixture, preferably with the most abrasive or granular products (a helicoidal mixer is recommended, although other types of mixer can be used by making the adjustments corresponding to process conditions).

3. Strict supervision that the product is homogenous. In the first applications it is recommended that an optical microscope be used for inspection.

Once the optimum type of fiber or fibers have been selected for the purpose desired on formulating the material, the load of fiber will be mixed with the rest of the components in accordance with the following process:

Stage A (First Step): One part of granular material (aggregates) will be loaded in the mixing equipment, preferably of particle size which is in the range of 0.149 mm to 9.5 mm, corresponding to sands and grits.

Stage B (Second Step): A proportional part of the fibers is loaded. The process forming the subject matter of this invention is applicable to cylindrical section fibers, and also to non-cylindrical section fibers such as sundry natural and synthetic fibers available on the market. It is also applicable to smooth, textured, fuzzy and pre-determined fibers, either in mono or multi filament.

The process forming the subject matter of this invention possesses sufficient flexibility for application to mixtures incorporating fibers of different origins, such as organic, inorganic, mineral, non-mineral, natural and synthetic.

This process is applicable to fibers of different lengths and diameters (calibers), which can range from a length of 3 mm to 80 mm with a diameter from 0.02 μm to 600 μm, preferably in a range from 5 mm to 50 mm in length and with a diameter of 100 μm to 200 μm (if mono filament fibers or for the individual elements of the multi filaments).

Stage C (Third Stage): The mixture is applied briefly (5 to 10 seconds)

Subsequent steps: The adding continues of successive loads of granular material and fibers in the same way with brief intermediate mixing, until the total load has been completed. The mixing of the total load of fiber with the sandy granular material then takes place for a period of 45 to 900 seconds, preferably in the range of 60 to 720 seconds. More specifically, the time will be determined by the characteristics of the fiber itself, including its hardness), the granular material, other components of the mixture and the intensity of the abrasive mixing due to the type and characteristics of the mixing equipment. It can also take place in a single stage if the intensity and time of the mixing are increased.

Termination: The remaining components involved in formulation of the mixture such as the larger granules, the cementants and other components, are then added and the final mixture takes place during a period ranging from 10 to 900 additional seconds, and preferably from 90 to 600 seconds. More specifically, the final mixing time will depend on the properties of the mixture components, on the size of the ingredients of lesser and greater size, their densities and the intensity of the abrasive mixture, based on the type and characteristics of the mixing equipment.

Discharge: In this stage a low intensity movement is maintained, always providing the characteristics of the equipment so permit, in order to retain the homogeneity of the fibrated mixture.

A third version of the present invention consists of the following:

Once stages A, B and C have been completed (steps 1 to 3), of the first pattern, incorporation of the fibers takes place as follows:

Stage D (First Step): Part of the granular material is loaded in mixing equipment of a continuous type, preferably of a particle size coming within the sands and grits range. The granular material can be dosed through a feeder of the vibratory or revolving band or helical worm type.

Stage E (Second Step): A proportional part of the fibers are loaded by means of a worm-type feeder.

Following Steps: Successive loads of granular material and fibers will be added continually until all the loads have been placed.

The mixing of the total load of fiber with the granular material will then take place during a period ranging from 45 seconds to 20 minutes, preferably in the 60 to 900 second range, and the time will be determined more specifically by the characteristics of the fiber itself (including its hardness), the granular materials, other components of the mixture and the intensity of the abrasive mixture, depending on the type and characteristics of the mixing equipment. A rotary drum-type mixer with or without inner partition walls is recommended.

Discharge: This stage is carried out by maintaining the movement with low intensity, always providing the characteristics of the equipment so permit, in order to retain the homogeneity of fibrated mixture.

A fourth embodiment of the present invention consists of utilizing fibers of greater length, up to several meters.

In this fourth embodiment, the fibers are conditioned by having a mixture of only the granular materials in any of the methods 1 to 3.

The conditioned fibers then separate while mixture of the formula takes place, following the descriptions of methods 1 to 3.

The mixture between formula ingredients and the long previously-conditioned fibers, together with the granules used in the conditioning, is then combined with the rest of the dry formula, preferably following the form of the final piece it is desired to produce. This operation can incorporate an adjustment of the fibers to place the resistance in the desired direction.

Finally, the water or the activator agent of the setting is added, it should be mixed or kneaded in order to maintain the homogeneity of the water or activator incorporated. This step is easy due the pre conditioning fibers according to this invention can be incorporated more easily with the dry formula and it produces a wet mix more uniform.

This embodiment is advantageous for manufacturing processes of extruded or formed pieces with mechanical processes.

The invention claimed is:

1. A process of forming a dry premix product comprising fibers and granular materials, comprising:
   adding multiple stages of loads of sandy granular materials consisting of particle sizes from 0.149 mm to 9.5 mm and polymeric fibers to a mixer;
   mixing each load of said sandy granular materials and polymeric fibers for 5 to 10 seconds;
   adding and mixing cementant materials to said mixer to form a dry premix product having an isotropic and homogeneous distribution of said polymeric fibers;
   optionally adding and mixing coarse aggregates; and
   unloading said dry premix product from said mixer,
   wherein the polymeric fiber content of the dry premix product is between 0.1 and 0.25 wt %.

2. The process according to claim 1, wherein the sandy granular materials are added with the cementant materials prior to mixing.

3. The process according to claim 1, wherein the cementant materials are selected from the group of Portland cement, Puzolana cement, natural or synthetic polymers, elastomers and volcanic ashes, which are in the form of fine or granular dust or in a semi-solid form.

4. The process according to claim 1, wherein the polymeric fibers are selected from polyolefins, polyesters, polyamides, acrylics, polyvinyls and aramids, and said fibers are straight, cylindrical, non-cylindrical, frizzy or spiral with thicknesses ranging from 0.02 µm to 5008 µm and lengths ranging from 0.02 mm to 100 mm.

5. The dry premix product obtained by the process according to claim 1.

6. The process according to claim 1, wherein after adding the cementant, the premix product is mixed for a period of 10 to 900 seconds.

7. The process according to claim 6, wherein the premix product is mixed for a period of 90 to 600 seconds.

8. The process according to claim 1, further comprising assessing the homogeneity of the distribution of fibers after a mixing step.

9. The process according to claim 1, wherein the mixing of the sandy granular materials and polymeric fibers causes extrusion and elongation of the fibers into an amorphous-cylindrical state with a significant increase in surface area relative to the original state of the polymeric fibers.

10. A process of molding cement, comprising adding water to the dry pre-mix according to claim 1 and molding it to a desired shape in the absence of a mold or wooden form.

\* \* \* \* \*